United States Patent
VanBree

(10) Patent No.: US 7,966,563 B2
(45) Date of Patent: Jun. 21, 2011

(54) SYSTEM FOR ORGANIZING AND DISPLAYING REGISTERED IMAGES

(76) Inventor: Ken VanBree, Mountain View, CA (US)

( * ) Notice: Subject to any disclaimer, the term of this patent is extended or adjusted under 35 U.S.C. 154(b) by 630 days.

(21) Appl. No.: 11/021,655

(22) Filed: Dec. 23, 2004

(65) Prior Publication Data

US 2005/0210415 A1    Sep. 22, 2005

Related U.S. Application Data

(60) Provisional application No. 60/532,850, filed on Dec. 24, 2003.

(51) Int. Cl.
*G06F 3/00* (2006.01)

(52) U.S. Cl. ........ 715/713; 715/730; 715/731; 715/732; 715/757

(58) Field of Classification Search .................. 715/526, 715/713, 730–732, 757
See application file for complete search history.

(56) References Cited

U.S. PATENT DOCUMENTS

| | | | | |
|---|---|---|---|---|
| 5,479,603 A | * | 12/1995 | Stone et al. ................... | 715/804 |
| 5,495,576 A | * | 2/1996 | Ritchey ........................ | 345/420 |
| 5,729,471 A | * | 3/1998 | Jain et al. ..................... | 725/131 |
| 5,999,662 A | * | 12/1999 | Burt et al. ..................... | 382/284 |
| 6,044,181 A | * | 3/2000 | Szeliski et al. ................ | 382/284 |
| 6,075,905 A | * | 6/2000 | Herman et al. ............... | 382/284 |
| 6,104,840 A | * | 8/2000 | Ejiri et al. .................... | 382/284 |
| 6,249,616 B1 | * | 6/2001 | Hashimoto ................... | 382/284 |
| 6,349,153 B1 | * | 2/2002 | Teo .............................. | 382/294 |
| 6,359,617 B1 | * | 3/2002 | Xiong .......................... | 715/848 |
| 7,134,080 B2 | * | 11/2006 | Kjeldsen et al. .............. | 715/730 |
| 2004/0095385 A1 | * | 5/2004 | Koo et al. ..................... | 345/757 |
| 2005/0108643 A1 | * | 5/2005 | Schybergson et al. ........ | 715/713 |

* cited by examiner

*Primary Examiner* — Steven P Sax
*Assistant Examiner* — Anil N Kumar

(57) ABSTRACT

This invention relates to a system for organizing, storing, retrieving and displaying spatially related images where such images may also be relatable within time or image modality parameters. The system includes a dynamically manipulable user interface capable of visually depicting one or more images in a registerable manner, and also depicting the orientation of the image or images in relation to the surrounding neighborhood. The inventive system provides for display of panoramic image sequences consisting of multiple rows with multiple images per row, or image sequences consisting of only a single image. In a preferred embodiment, images taken from the same perspective at different times can be overlaid, and the user manipulates the display to perform real-time compare and contrast between images. In an alternate embodiment, the registered images include those created by means of different imaging modes or modalities such as, for example, visible light images and thermographic images.

2 Claims, 10 Drawing Sheets

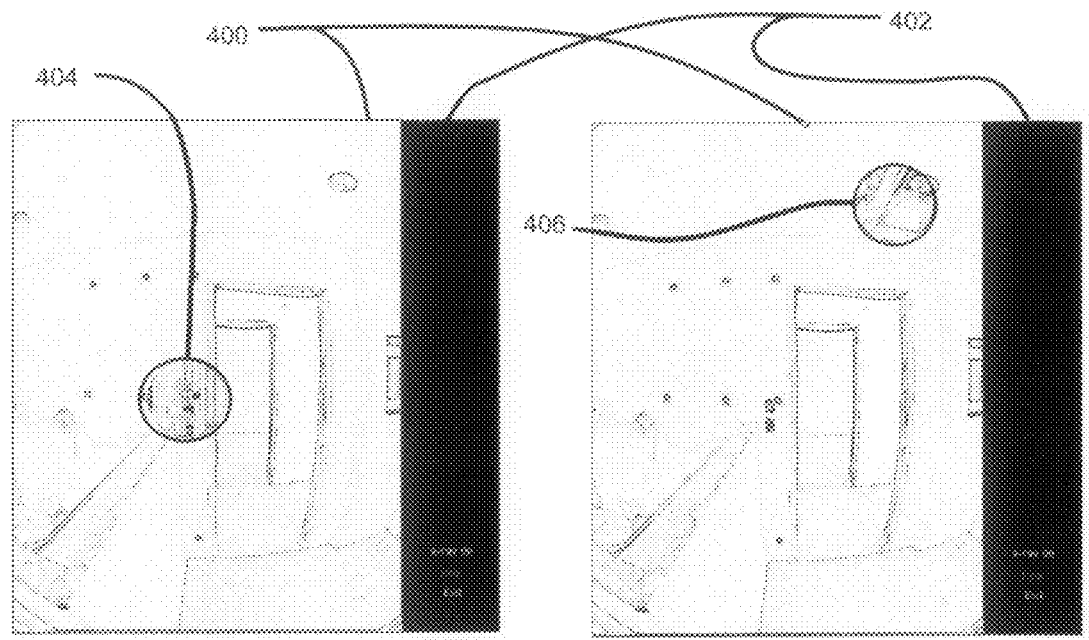
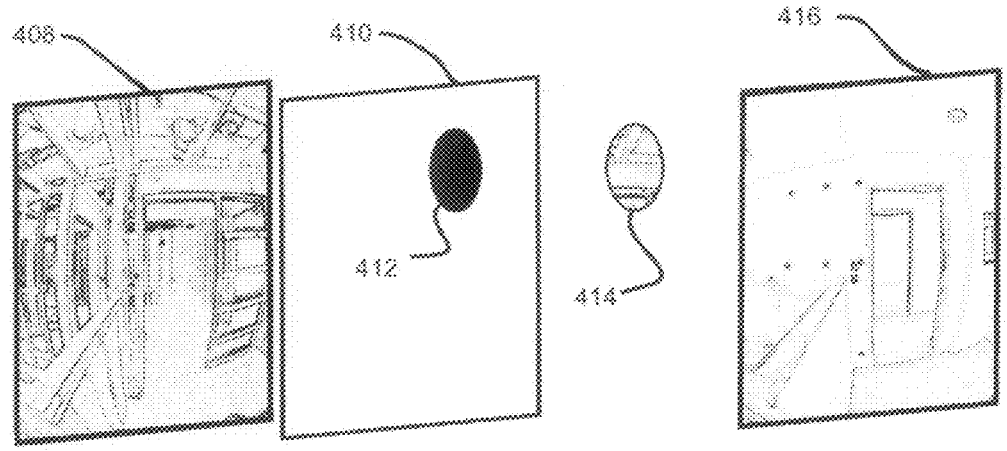
Figure 4a   Figure 4b
Figure 4c
Figure 4

SYSTEM FOR ORGANIZING AND DISPLAYING REGISTERED IMAGES

CROSS REFERENCE TO RELATED APPLICATIONS

This Application is related to provisional application 60/532,850 filed Dec. 24, 2003, the entirety of which is incorporated by this reference, and claims priority therefrom.

GOVERNMENT FUNDING

Not applicable.

BACKGROUND

This invention relates to imaging, and more particularly to the spatial and temporal organization of images and related image data.

Panoramic images have been used for many years to generate both high quality printed images, and immersive images that can be viewed and manipulated through a user interface. Linked panoramic images are available in a variety of formats that allow, for example, a potential homebuyer to do a "virtual walkthrough" of a home through a web-based user interface. Significant limitations exist on the usefulness of such images as currently presented.

For example, U.S. Pat. No. 6,359,617 (Xiong) teaches algorithms for blending rectilinear images into virtual reality panoramas and modifies the images for blending, keeping track of panoramic images that are used to create final image. However, Xiong does not display constituent images in their unmodified form, and does not relate images to their environment. U.S. Pat. No. 6,173,087 (Kumar, et al) teaches a process for alignment of multiple images that does not require distortion-free images. Kumar, et al builds a composite image from multiple images, each of which is warped to fit into a reference coordinate system. Although Kumar, et al teaches producing a distortion free composite of images taken at the same point in time, it does not teach producing composite images from constituent images, each image from the same imaging point, taken at multiple points in time.

Moreover, available systems used for organizing and displaying high-quality panoramic sequences require a significant amount of computation (and, consequently, computer processing run time) in order to generate a composite image from a sequence of images. The resulting blended image suffers loss of detail from contributing images. Such loss of detail hinders generating a good model of the structures shown in the images. Furthermore, current panoramic image viewers cannot provide registered time-sequential images (that is, images taken from the same imaging point or what is referred to as "perspective") at times that differ by days, months, or years.

What is needed is a system capable of registering multiple images where each image shares the same perspective and each image was created at a different time. What is also needed is the ability to overlay such time distinct images to record observable changes over time. Further needed is the ability to relate images into a panoramic schema while preserving the relationship between the images and the scene of interest, i.e. the neighborhood surrounding the image or images. Further needed is a dynamic user interface display means enabling users to rapidly access images, visually relate the image to its surrounding environment, move around the neighborhood and access portions of the same or different images—even images from different imaging techniques- and images taken at different times, provided any image is registerable with (taken from the same perspective) as an image desired to be viewed on the user display interface at the same time.

SUMMARY OF THE INVENTION

The invention taught herein provides a solution to the needs articulated above. The invention provides a system for displaying images, including composite images and panoramic sequences of images, where the images have been taken from the same perspective at the same or different times. The system may overlay such images to gain additional information about changes over time. The inventive system also provides a means of displaying panoramic sequences of images where such display preserves the relationship between the images as well as the orientation of images to the larger context to which the images meaningfully relate, that is, the neighborhood of the imaging location relative to the image perspective. The term "image" as used herein, is intended to include any output of any imaging source. Such imaging sources include, but are not limited to, visible light based sources, themographic sources, or any other imaging source or device.

The invention provides an image management system enabling rapid and easy retrieval and display of multiple images or collections of images, where such images are spatially related and may also be related according to non-spatial parameters. The mode or modality of the imaging device or the time of imaging, or both, may be, for example, non-spatial parameters associated with the imaging data. The inventive system provides a user interface operably associated with computational modules capable of image storage, image retrieval, image composition, and image display. The user can connect with the user interface by a variety of devices (PC. PDA, any mobile device or any other instrument with display capability), and the user interface may output a user interface display. The inventive system user interface display has an image display area and an information and control area, both contributing to the user's quick comprehension of the spatial and temporal relationship of the images selected for display. The user interface display according to the present invention is dynamically manipulable, enabling the user to select a stored map (a construction blueprint in the preferred embodiment) from the control panel, and the map appears in the image display area. The user may point and click or otherwise interact with the user interface display to simultaneously display both a feature (ex. a room wall) as well as a visual indication of the point from which the image was created, called the "image locator" (i.e. where the camera/imaging device was positioned at the time of image creation) and the visual indication of the direction the camera/imaging device was pointing when the image was created. The user can simply move around the map and other images and portions of images taken from the same perspective are seamlessly viewable. Thus, for example, a wall can be viewed from framing, through electrical installation, through drywall and finishing on the dynamically manipulable interface display.

The invention provides a user interface display that displays the images to the user in an easily understood format. In particular, the display format is especially useful to those familiar with blueprints, maps or shop drawings, including contractors, architects, or surveyors.

The invention provides a means for organizing and presenting images through the user interface display in a manner that integrates detailed information concerning any image with respect to the image sourcing environment (the position from which the image was generated) and the neighborhood in which the image sourcing device was situated. For example, the spatial relationship between a selected image retrieved by the user and neighboring images will appear on the interface display by means of the image locater within the image display area on the user interface display. The image locater assists the user by visually contextualizing the selected image within a map and showing the neighborhood or surroundings in which the image was taken.

The invention also provides for retrieving, viewing and comparing images taken at the same or different times from a selected perspective (image sourcing position) without extensive calculations slowing down the user's viewing experience. This is facilitated by use of "zone of focus" calculation and storage of calculation results for each image, establishing the orientation of the image source device with respect to each stored image.

The invention also provides a means for combining multiple viewing modes (for example a composite (FIG. 4) in conjunction with a transparency mode (not shown)). Further, different image types (e.g. visual and thermographic) may be overlaid and displayed on user interface display—image display area. In all of these modes or combinations of image display, the dynamically manipulable user interface display operates to easily and rapidly orient images on the selected map or blueprint, to indicate the image locater, and thus enhance the users perception of the context of any selected image.

4c illustrates the composite images reveals an image taken at one time in the context of an image taken at a different time.

4e through 4i inclusive illustrates thru-view window in various combinations of foreground and background selection.

Figure 5:
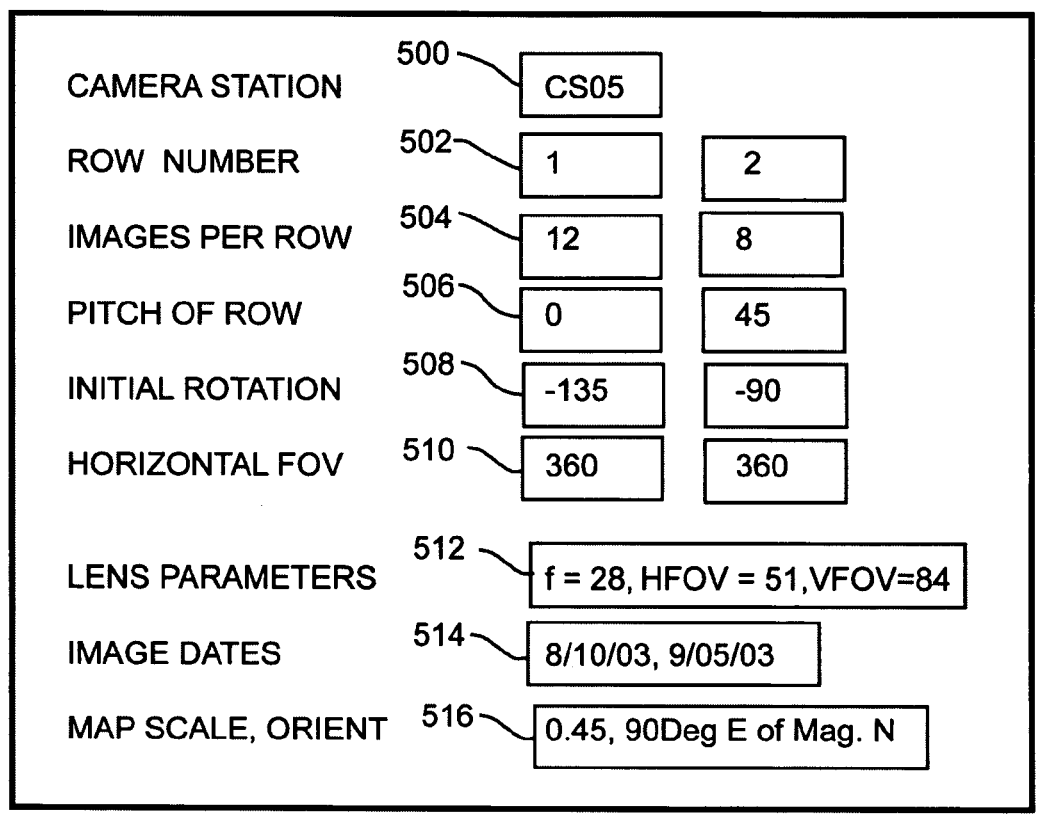

FIG. 5 depicts data structures useful for displaying registerable images taken at the same or different times.

Figure 6:
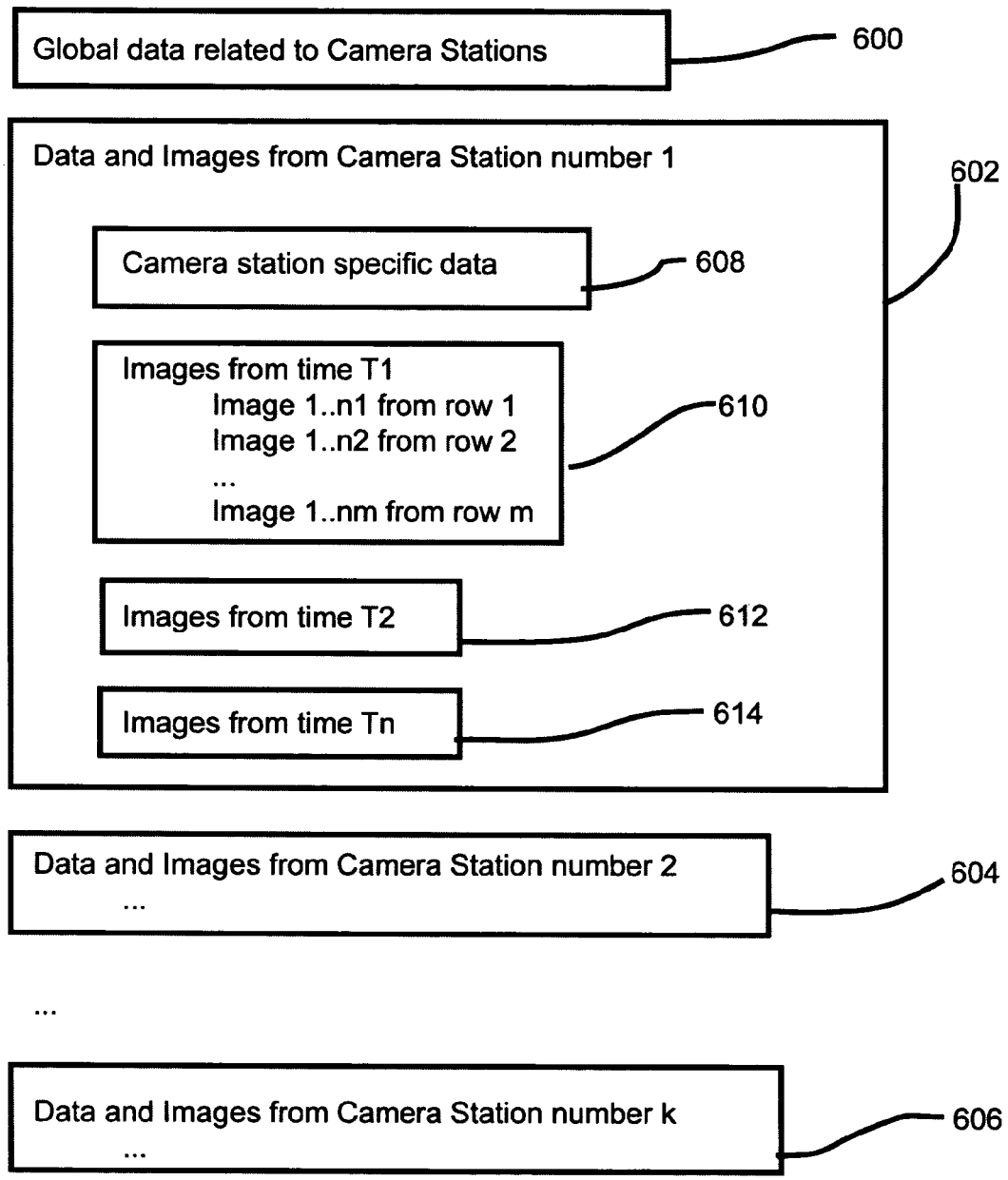

FIG. 6 depicts a generalized data structure useful to contain images and related image data from multiple imaging locations, and from multiple imaging times.

DETAILED DESCRIPTION OF THE PREFERRED EMBODIMENT

Although the discussion of the preferred embodiment and the accompanying figures may use the word "camera" or related terms, it is intended that "camera" and related terms mean any image sourcing device, that is to say, any device capable of imaging some aspect of interest, whether operable on visible light, non-visible radiation, temperature, bio-mass sensor, or any other image-able feature amenable to an image sourcing device. Although general in teaching, the invention herein described is useful in conjunction with that described in U.S. patent application Ser. No. 10/811,019 filed Mar. 26, 2004 entitled "System for Accurately Repositioning Imaging Devices".

Referring to FIG. 1, an exemplar screen of the user display interface illustrates one embodiment of the present invention. The user interface display 100 (also referred to herein as a dynamic display) provides two areas: the image display area 102 and the information and control area 104. The information and control area 104 displays, among other data, the date 120 on which the Image 116 selected for viewing by the user was created. The image display area 102 provides a map M of the area around the Image 116. A map M is selected from the control area, and in the example discussed here, the map is a construction blueprint. All available maps may be selected from the control area. The orientation of the Image 116 in relation to the map M of the image display area 102 is shown by the image-locator 108. The image-locator 108 is centered at the camera station 112. The camera station 112 represents the position relative to other objects represented on the map M at which the camera was physically located at the time the Image 116 was created. Other camera stations 106 are shown on the map M. These other camera stations 106 have no corresponding images shown on the user interface display 100. The zone of focus 110 shows the orientation and field of view of the camera lens associated with creation of the Image 116. The reference feature 114 is a feature displayed on the map M that provides a reference for the orientation of the camera station 112 and the zone of focus 110. Markers 118 on the reference feature 114 are captured by the camera located at camera station 112. The known physical locations of markers 118 can be used to calculate the orientation of the imaging device located at camera station 112 relative to the reference feature 114. The location of Marker 122 is shown on the map M as a cross 124. The dashed line linking the Marker 122 and the cross 124 indicates a correspondence that is used to orient the image-locator 108 on the map M. The calculations required to determine the proper orientation of the image-locator 108 are detailed in FIG. 3. FIGS. 1b through 1e, inclusive illustrate how the selection of a camera station 112, (from among available camera stations 106) and the corresponding zone of focus 110 causes the display of the image 116 to change. For example, in FIG. 1b, camera station 112, and zone of focus 110 displays the selected view 116 acquired when the camera was at that camera station and oriented according to that zone of focus 110. In FIG. 1c, the zone of focus 110 has shifted clockwise, and the image 116 is an image captured when the camera was oriented accordingly at camera station 112. FIG. 1d and 1e respectively depict a different camera station 112 and two images 1d 116 and 1e 116 each taken from a different zone of focus (1d 110 and 1e 110) when the camera was at that camera station and oriented accordingly. The image 1d 116 and 1e 116 display the captured image taken from that camera station 112 and oriented accordingly. Thus, it can be appreciated that the neighborhood of the camera station may be viewed by selecting each of the zones of focus and, depending only on the number of available images obtained, a substantially 360 degree view of the images taken from any camera station may be viewed.

Figure 1A:
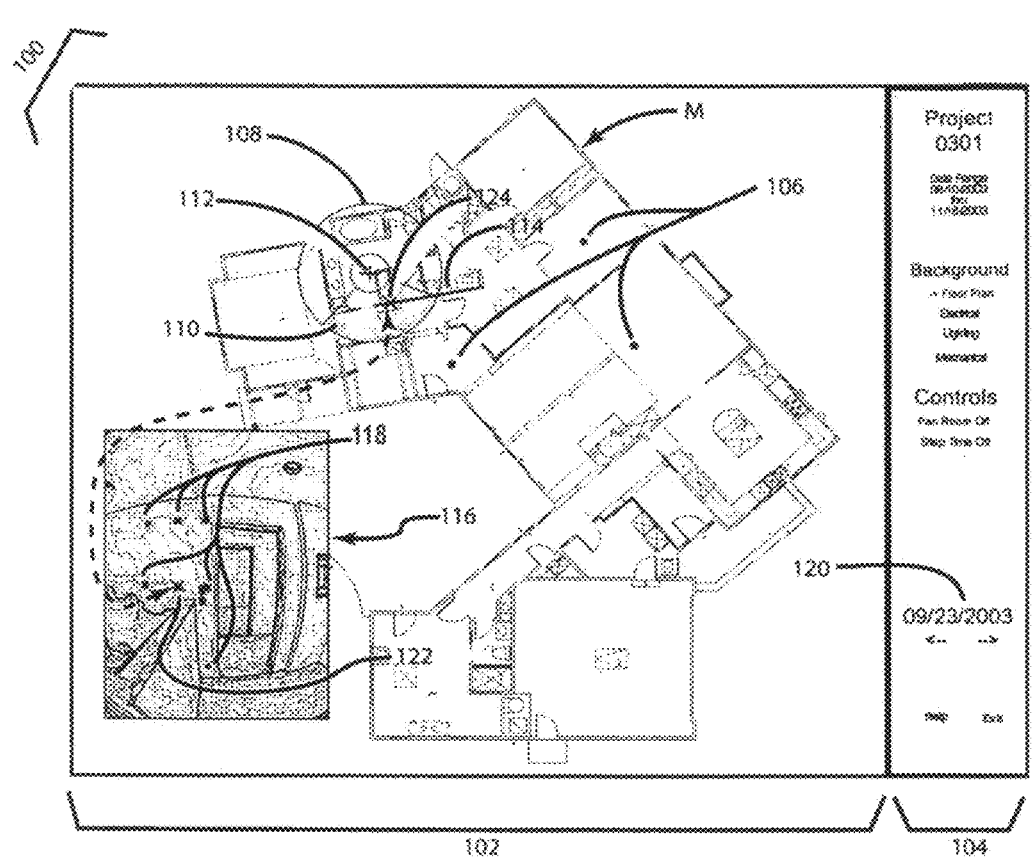
FIG. 1a is an exemplar of the user interface display according to the present invention.
Figure 1B:
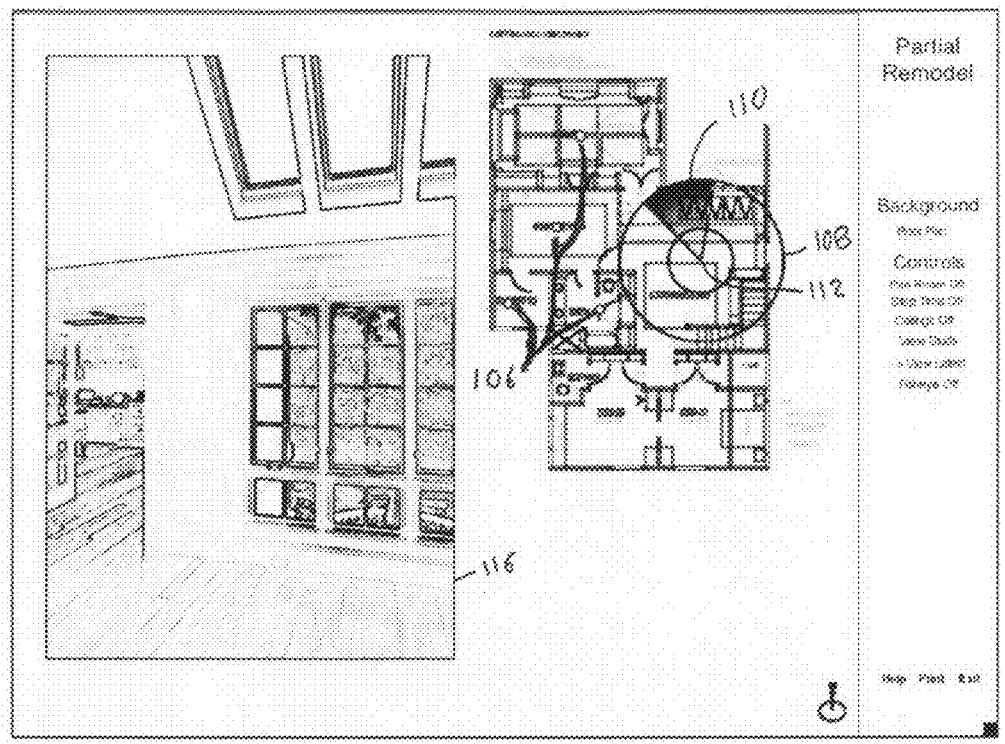
FIG. 1b through 1e, inclusive, illustrate how the view indicator relates the images to the neighborhood FIG. 2 diagrams a generalized system for one embodiment of the present invention.
Figure 1C:
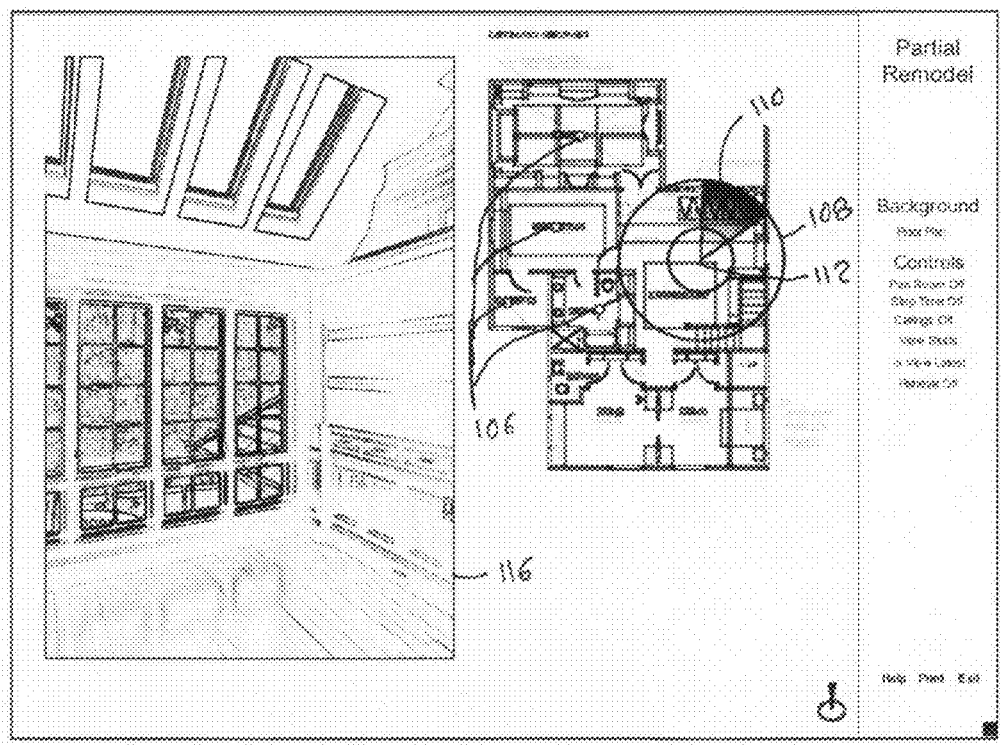
Figure 1D:
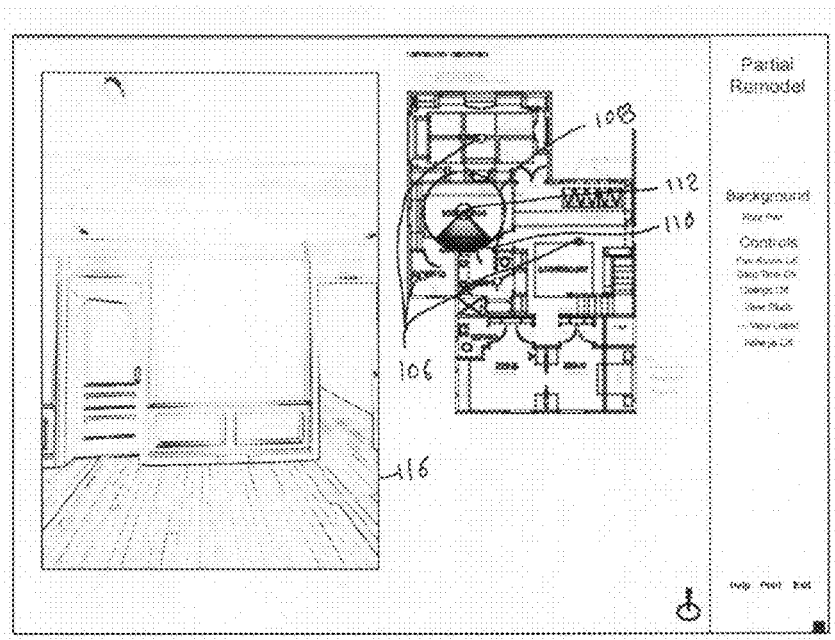
Figure 1E:
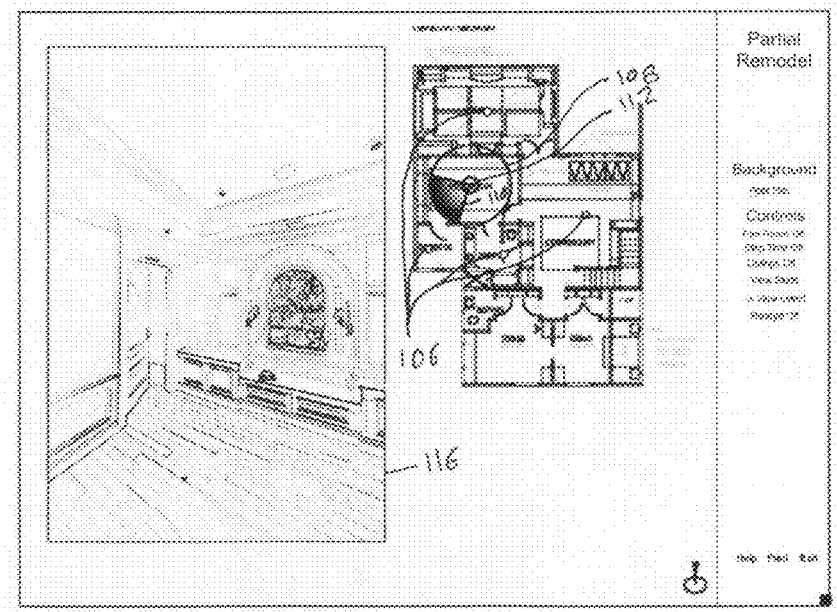
Figure 2:
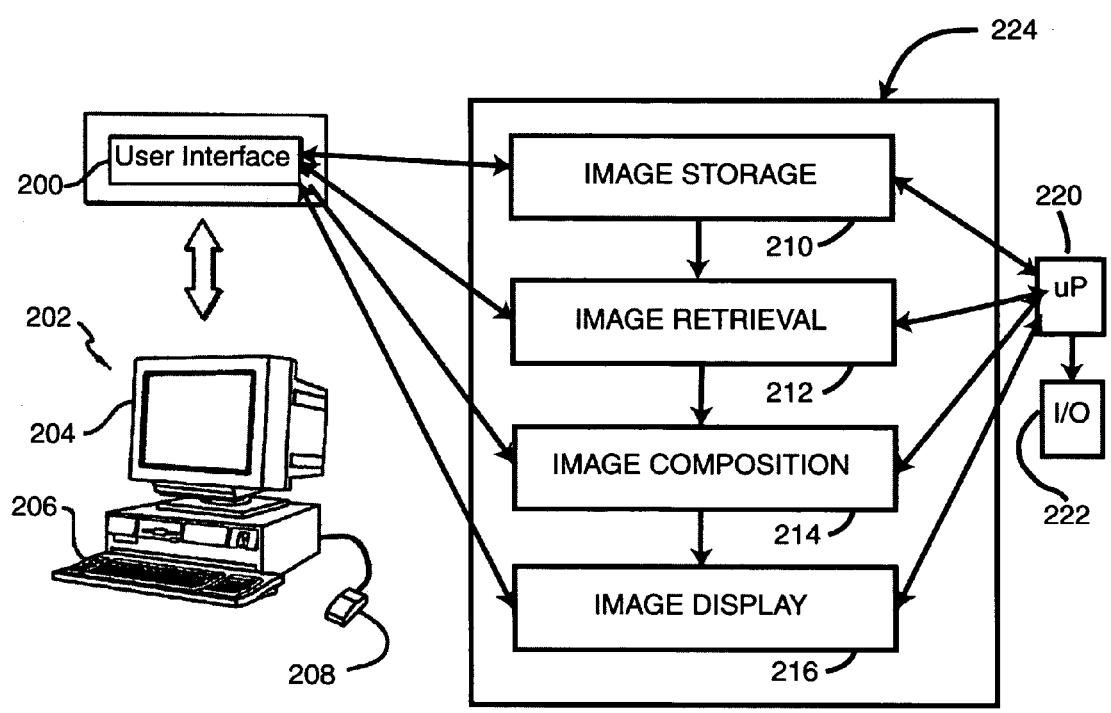

FIG. 2 depicts a generalized system diagram for one embodiment of the present invention. The user interface 200 is implemented on an interactive display system 202. The interactive display system consists of a display device 204 an input device 206 and a pointing device 208. The user interface consists of a collection of modules 224 that implement the user interface 200. The image storage module 210 stores the collection of images needed to implement the user interface.

The image retrieval module 212 responds to user commands to select the proper image from image storage. The image composition module 214 overlays images taken from the same perspective (ex. some selected camera station 112, 106 in FIG. 1) at different times. The image display module 216 positions the images generated by the image retrieval module 212 and the image composition module 214 on the user interface display 100 (FIG. 1) and positions the image locator 108 correctly relative to the map M located in the image display area 102. The user interface collection of modules 224 is implemented on a computing device 220 that is connected to an Input/Output device 222. The Input/Output device 222 may be used to print hard copies of images displayed on the user interface display 100, and to send and receive message from sources external to the interactive display system 202, such as, for example, the Internet.

Figure 3:
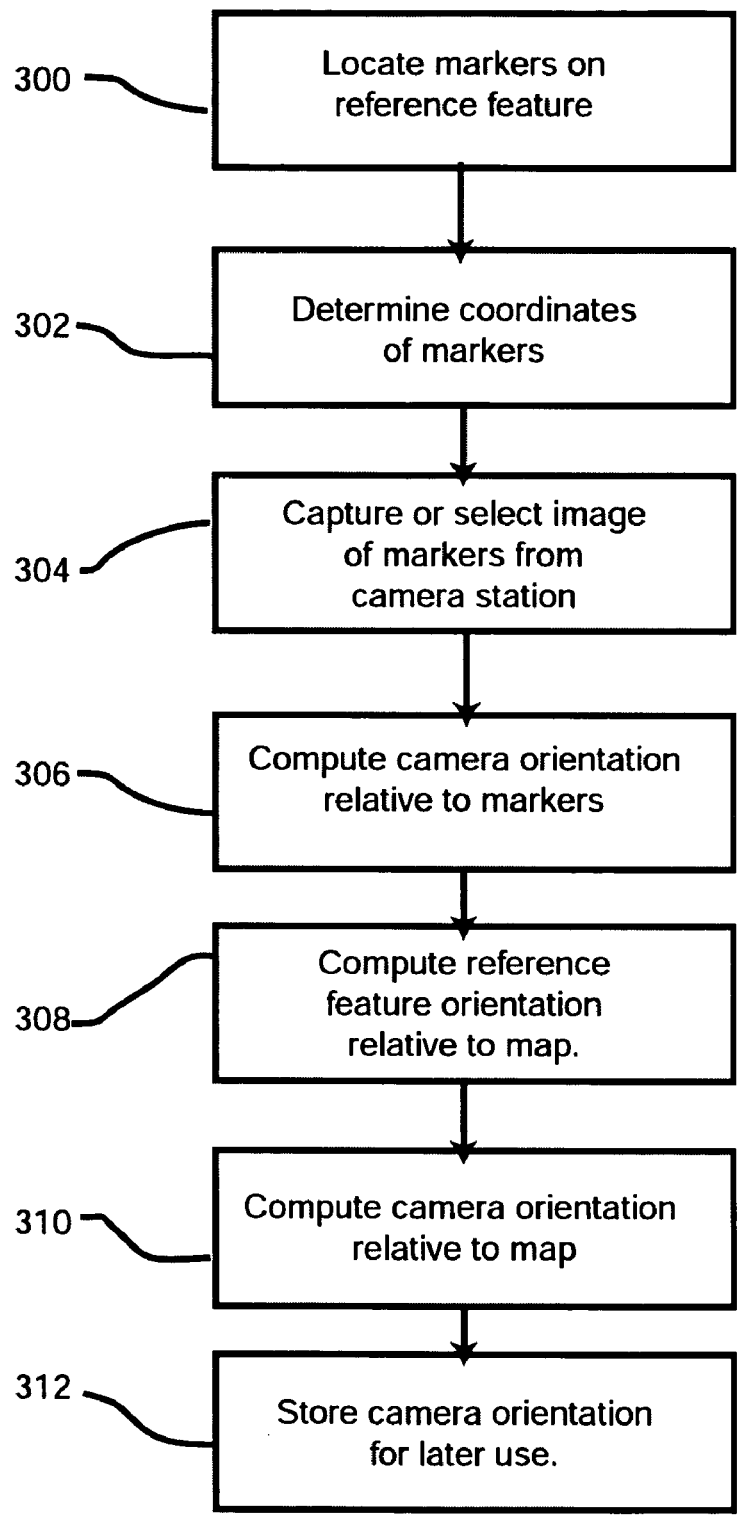
FIG. 3 illustrates a generalized algorithm for computing the orientation of an image source device with respect to a map of the neighborhood surrounding the image source device position at the time of image sourcing.
Figure 4D:
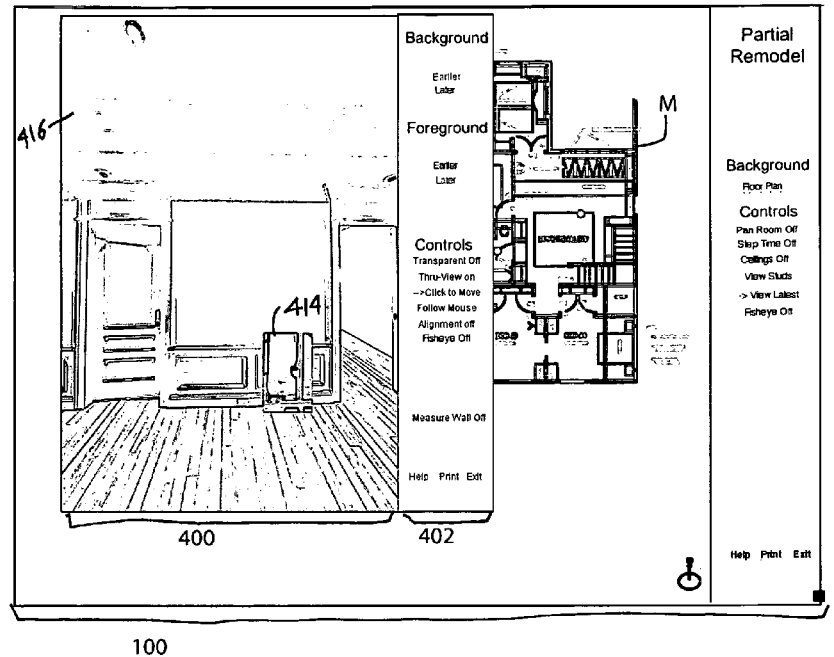
FIGS. 4 4a and 4b depict two specimens of composite images created from two images taken from the same perspective at different times.
Figure 4E:
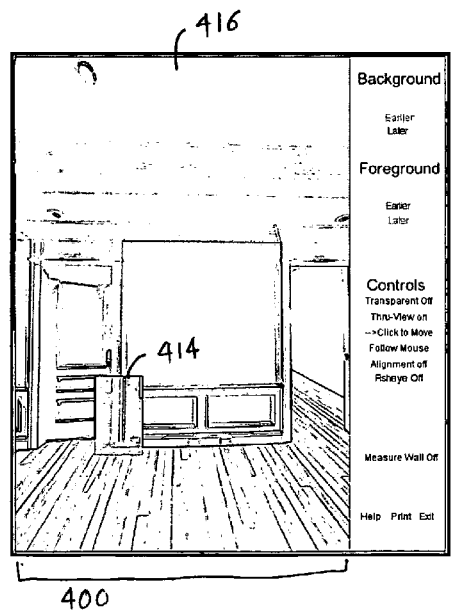
Figure 4F:
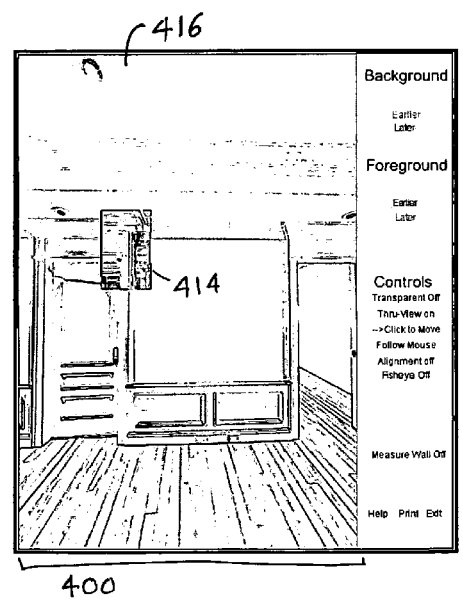
Figure 4G:
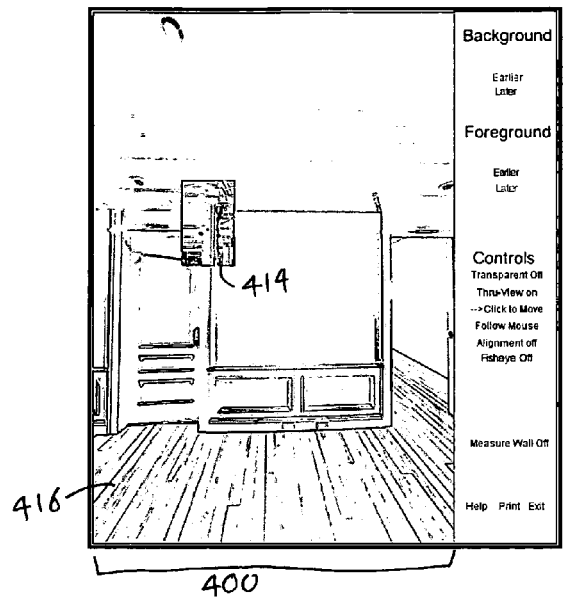
Figure 4H:
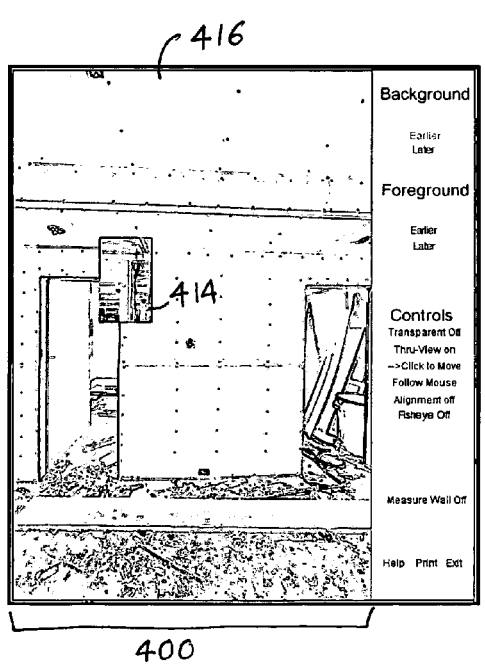
Figure 4I:
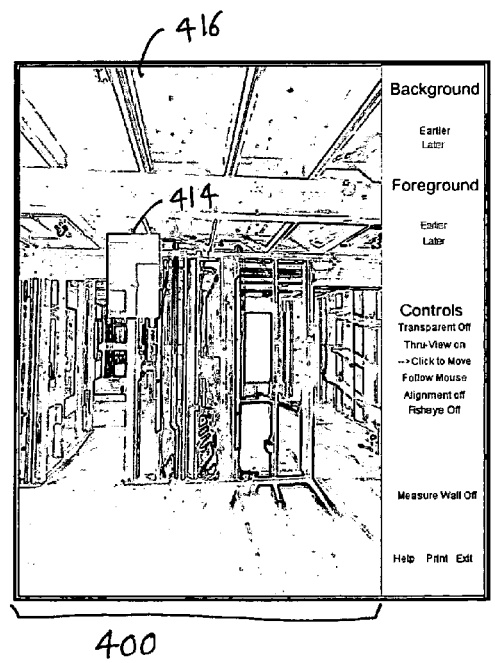

FIG. 3 illustrates some details of calculations needed to orient the zone of focus (110 on FIG. 1) with respect to the map M on the image display area (102 on FIG. 1). Locating markers Step 300 on the reference feature (114, FIG. 1) is the first step. These markers (118, FIG. 1) can be naturally occurring points in the scene upon which images are to be taken or markers specifically placed in the scene to help determine camera orientation. One of the markers (e.g. Marker 122, FIG. 1) is chosen to represent the origin of the real-world coordinate system represented both in the map (M, FIG. 1) and in the Image (116, FIG. 1). Measuring and recording for later use Step 302 the real-world locations of all markers 118 relative to a known origin (represented in FIG. 1 by 122 on image 116 and point 124 on reference feature 114 on map M) is the next step. Acquiring an Image (116 in FIG. 1) of the markers (118 in FIG. 1) from a camera station 112 is Step 304. Application of known algorithms for computer vision Step 306 for computer vision such as those found in Hartley and Zisserman, *Multiple View Geometry in Computer Vision*, to determine the orientation of the camera that recorded the Image 116 relative to the markers 118 embedded in the image. Computing the orientation of the reference feature (114 in FIG. 1) relative to the map (M in FIG. 1) is Step 308. In Step 310, the orientations computed in Steps 306 and 308 are combined to determine the orientation of the zone of focus (110 in FIG. 1) relative to the map M. In Step 312, the orientation calculated in Step 310 is stored for use in displaying panoramic images taken from the associated camera station (112 in FIG. 1)

FIG. 4 consists of three parts. FIGS. 4a and 4b show composite images. FIG. 4c shows how the composite images in FIG. 4a and FIG. 4b are generated. The composite images in FIGS. 4a and 4b consist of an image area 400 and a control area 402. A first feature 404 in FIG. 4a and a second feature 406 in FIG. 4b show composite views of the same scene where a portion of an image taken from the same perspective at a different time (in this case, earlier in the construction process) is overlaid on the current image. FIG. 4c shows how the first and second features 404, 406 are overlaid to create a composite image in FIGS. 4a and 4b are generated. A mask 410 identifies an image portion 412 which is to be overlaid. The mask 410 is applied to a first image 408 such that only the image area 412 of first image 408 is visible. The resulting masked image 414 is positioned on second image 416 to create a composite image appearing in the image area 400 in FIGS. 4a and 4b. The masking operation illustrated in FIG. 4c is a common operation performed by image manipulation and display programs such as Adobe's PhotoShop and Macromedia's Director. Any of the plethora of commercially available image display manipulation tools may be applied to modify the user interface display. FIG. 4e through 4i, inclusive, illustrates manipulable composite (also referred to herein as "thru-view") in the image area 400. According to the invention, the User may not only determine the position of the "window"—the image portion 412 of the resulting masked image 414—with respect to the first image 408. The User may also select, by virtue of the control area 402 from among a variety of foreground and background selections. Thus the User determines the location of the composite as well as the images to be composited. The User may select from a control area 402 of construction stages (see right hand panel: date range, foreground, background) and quickly and easily generate a variety of composite images accordingly to what features may be of interest. FIG. 4d shows the thru-view in context of the user interface display 100 and the map M. FIG. 4e through 4i illustrate User selection of the location of the "view through window" (the resulting masked image 414) and the composite image of said view thru window and a selected second image 416, displayed in the image area 400. For example, FIG. 4e, the composite appearing in the image area 400 shows a the selected second image 416 (also referred to as the background image) is an image of later stage (possibly completed) construction and the resulting masked image 414 displays the selected location at an earlier time (i.e. stud stage). In FIG. 4f, the image portion 412 has been moved to another location in the image area 400, and the second image 416 is the same as in 4e, and the resulting masked image 414 displays an image of the selected second image 416 at an earlier stage of construction. FIGS. 4 g, h and i, inclusive, illustrate that the User may, by virtue of the Control panel, change the background image (selected second image 416), and the resulting masked image 414. In FIG. 4g a late stage of construction is the background, and the window reveals a view of an earlier construction stage. FIG. 4h shows an early background [416], with the window [414] (drywall background and studs window) showing a later construction stage and 4i shows a background of stud stage and the window of final, completed construction. Thus it can be appreciated that the User can manipulate where the view through is desired in the image areas and can move the "window" to the desired portion of the image area. Further, the User can make any variety of composites, by selecting the background and window, or foreground, image.

A user interface enabling the user to input various information about images or panoramic sequences of images is depicted in FIG. 5. User-input information is stored for later reference and used to generate the dynamic display, the image display area 102 as shown in FIG. 1. Data "camera station" 500 identifies a camera station (106 and 112 in FIG. 1) located on the map M in FIG. 1. Data "row number" 502 is used to distinguish between panoramic sequences in a situation where more than one row of panoramic sequences was taken and data entered at "camera station" 500. The number of "images per row" 504 identifies the number of images in the panoramic sequence contained in that row. For example, there could be a single image in any given row. The "pitch of row" 506 indicates the angle between the center axis of the lens of the camera (where the imaging device uses visible light) and the horizontal plane. Positive numbers for the pitch indicate that the imaging device is pointed up, while negative numbers indicate the imaging device is pointed down. The "initial rotation" 508 is the orientation of the zone of focus (110 in FIG. 1) to the map (M in FIG. 1). The algorithm outlined in FIG. 3 derives the initial rotation 508. The "horizontal field of view" 510 is the field of view of the entire sequence of images stored in the given row. A field of view of 360 indicates that the panorama includes a full horizontal circle. The "lens parameters" 512 record information such as the distortion parameter, focal length, horizontal field of view and vertical field of view of the lens used (if any) to create the images in the given row. In applications where a non visible light imaging source is used, there is a functional equivalent operable to record relevant parameters The "image dates" 514 is a listing of dates or times at which images in a given row were taken. The "map scale and orientation" 516 data is used to insure that the image locator (108 in FIG. 1) is scaled and oriented correctly with respect to the underlying map (M in FIG. 1).

FIG. 6 depicts a generalized data structure for holding images and information necessary to generate the dynamic display of registered images appearing on the user interface display (100 in FIG. 1). Although this example describes data associated with images from visible light imaging device, it is appropriate to state again that in the event another imaging source is used (e.g. thermography), the accompanying data structures would be modified inasmuch as the data within the structure would so require.

Data that locates the camera station positions (106 and 112 in FIG. 1) and reference features (114 in FIG. 1) are collected in "Global data related to Camera Structure" 600. "Data and images from camera station 1" 602 contain data pertinent to a first camera station (not shown). The same data elements outlined for "Data and images from camera Station number 1" 602 are stored for all additional camera stations 604, 606. "Camera station specific information" 608 includes the information detailed in FIG. 5. Images from a given camera station are identified by row number and images for a given row are organized in a known sequence 610. One embodiment of the current invention is to organize the images in row 1 in linear order from the first image to the last image, such that if the images were laid side-by-side in order they would create a composite image that spanned the horizontal field of view of the image row. Images taken from first camera station at times other than Time T1 are shown in 612 and 614. The organization of data for images from a first camera station is repeated for all camera stations. The data organization shown in FIG. 6 allows easy access to images from any time and camera orientation such that the images can be quickly displayed (for example, the Image 116 of FIG. 1) and overlaid to display composite images as in FIG. 4a and FIG. 4b.

The invention can be applied to, but is not limited to, the following applications: revealing hidden detail in commercial and residential construction; revealing structural details of interest to architects and engineers; revealing sun/shade patterns over the course of days or years; producing special effects for the movie and advertising industry; revealing changes in cityscapes over time; illustrating plant growth over days and years; revealing natural erosion or wear patterns; creating new art-forms with time as an element; illustrating changes occurring in interior spaces.

The embodiments set forth herein are merely illustrative of the principles and applications of the present invention. Numerous modifications may be made to the illustrative embodiments and other arrangements may be devised within the scope of the present invention as taught by the specification, the drawings, and any appended claims.

I claim:

1. A graphical user interface which is part of a system capable of receiving user input, manipulating stored data and outputting data in user selectable format comprising:

image display area on a display device, wherein a selectable plurality of acquired images may be controllably displayed on the display device and wherein selection of images is based on displayed multiple viewports, where each image of said plurality of images was taken by an image capture device at a unique time and where among said plurality of acquired images there are at least two sets of images, such that for any set of images, the image capture device was positioned in substantially a single real-world position and for any single-real world position of said image capture device, a plurality of orientations and fields of view are captured in said acquired images;

map area on the display device, wherein a two-dimensional rendering depicting the environs of said plurality of images and including viewports which may be selected and which, upon selection, cause to be displayed in the image display area on the display device an image corresponding to the selected view from the selected viewport and selected orientation around the selected viewport; and where said images are registered, wherein registering comprises displaying said images from the substantially single real-world position of the image capture device at the time the selected image was taken independent of the differences in image content as between the sets of images, and further in said map area a selection causing display of up to a full 360 degree view around the selected viewport, where the viewport represents the position of an imaging device, where said 360 degree view is comprised from a plurality of sets of registered images, so that said display of selected images appear as displayed multiple viewports; and control area on the display device, wherein map area and image parameters are selected, and said parameters include modalities of time and imaging device, wherein said imaging device includes infrared, visual and thermal imaging devices.

2. A graphical user interface as described in claim 1 comprising:

image display area on a display device, where said image display is a display of multiple layers in a thru view display, wherein at least one composite image may be displayed on the display device in response to selection of a first image and a selection of some portion of said first image, and selection of a second image, such that the portion of said first image appears properly oriented to the corresponding portion of said second image, wherein said first and second image are each from the same perspective and vary only in a non-spatial parameter and where at least one image is a non-CAD image taken by an imaging device, and proper orientation is independent of the content of the first and second image and dependent on the substantially identical perspective of the first and second image, such that said image display displays multiple layers in a thru view display; and said composite is dynamically manipulable such that the movement of a user controlled device causes the selected portion of the first image to likewise move on the image display area on the display device, and the composite image changes in response to such manipulation, so the thru view provides a movable viewport.

* * * * *